Feb. 4, 1969   R. J. BAIER   3,425,239

SHAFT DAMPER

Filed Feb. 10, 1967

INVENTOR.
ROBERT J. BAIER
BY Matthew P. Lynch
Franklin ?.
HIS ATTORNEYS

United States Patent Office 3,425,239
Patented Feb. 4, 1969

3,425,239
SHAFT DAMPER
Robert J. Baier, Claymont, Del., assignor to The Boeing Company, Seattle, Wash., a corporation of Delaware
Filed Feb. 10, 1967, Ser. No. 615,231
U.S. Cl. 64—6                                   10 Claims
Int. Cl. F16c 1/00, 23/08; F16d 3/12

ABSTRACT OF THE DISCLOSURE

An apparatus for providing damping of rotating shafts, wherein the apparatus acts to dampen the shaft deflections by acting in response to the angular deflections of the rotating shaft. The damper accomplishes the damping action by using the support bearing of the shaft in effect as a wobble plate for purposes of acting on the cylinder of the damper, whereby the bearing and the damper structure act to dampen shaft deflections.

---

Figure 1:
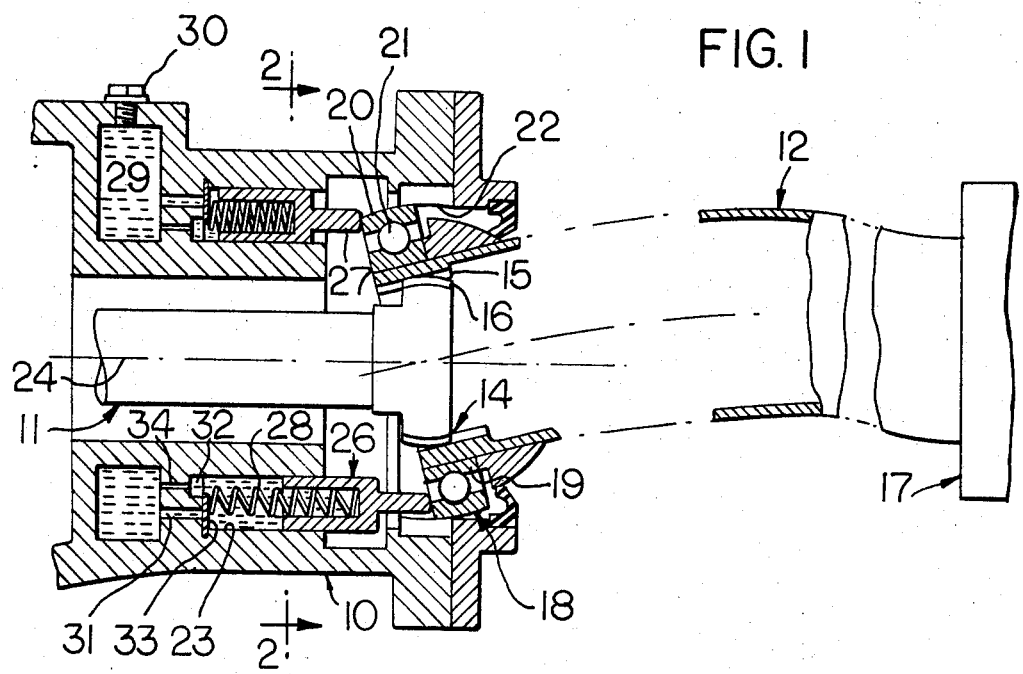

This invention relates to a method and apparatus for damping a shaft and, more particularly, to a method and apparatus for controlling the deflections of a shaft rotating within its critical speed range.

When an unbalanced shaft having a spring rate is rotated, it becomes dynamically unstable and deflections occur in the shaft to produce an alternating or orbital load which is felt as a vibration in a driven member. Since such deflections are of greatest significance at the shaft's critical speeds, the description of the invention as hereinafter set forth shall primarily refer to a shaft when driven at one of its critical speeds. However, it should be understood that the advantages of this invention are applicable to all speeds at which an unbalanced shaft experiences deflections.

A shaft has a plurality of critical speeds with each of the critical speeds occurring when the speed of rotation of the shaft equals one of the frequencies of the shaft's natural vibrations. For the shaft's lowest mode of natural frequency, the critical speed of the shaft is known as the first critical speed. These frequencies of natural vibrations are a function of the shaft's geometric dimensions and physical characteristics such as the length, shape, and density as well as the non-homogeneity of shaft material.

When an undamped shaft operates at one of its critical speeds, the deflection resulting from unbalanced forces frequently causes the shaft to either fail or cause physical damage to its supporting structure. Thus, the lack of positive deflection control for shafts rotating at critical speeds has limited the use of shafts operating at or above their first critical speed. Shafts, which operate near or above their first critical speed, are considered to be operating in their supercritical speed range.

As a result, shafts have previously been operated below their first critical speed in order to avoid deflection and resulting vibration. However, to maintain subcritical operation, shaft diameters have had to be large and the lengths of their individual sections have had to be kept short. Accordingly, it has been necessary to employ additional adapters, fittings, bearings, and hangers to support the various portions of the subcritical rotating shaft. Accordingly, subcritical power transmission shafting includes both economic and weight penalties. Both of these penalties, and particularly the weight penalty, are particular problems in the aircraft field where weight reduction is an important requisite. In helicopters, for example, a power shaft is employed in the transmission system to transmit power the entire length of the fuselage. Thus, the additional adapters, fittings, bearings, and hangers, as well as the large shaft diameters, create a substantial weight disadvantage.

The present invention provides a method and apparatus for controlling shaft deflections by damping the forcing function which causes shaft deflections. Accordingly, the invention provides for shaft operation at or above the shaft's first critical speed. Thus, the shaft may be of smaller diameter, longer length, and have less supporting structure. Accordingly, a substantial cost and weight reduction is obtained when employing the present invention with a high speed shaft system.

When a shaft operates at or near one of its critical speeds, the unbalance present will cause deflection in the form of at least one loop, which rotates much like a jumping rope and is known as "whirl" or "orbital" motion. The spherical aspect or convex periphery of the bearing supporting the shaft accommodates this deflection wherein the shaft rotates and oscillates laterally. Therefore, when the shaft deflects, it forces the end bearing out of what may be considered its nondeflected plane; and, as the shaft rotates, the inner bearing race and the outer race are oscillated axially. That is, the axial distance of a point on the housing supporting the end of the shaft and its bearing to a point on the outer race of the spherical bearing will change as the deflected shaft rotates the bearing race out of plane. Thus, the bearing oscillates axially and acts like a "wobble plate" with respect to a point on the housing supporting the end of the shaft.

This oscillating motion, which is present only when the shaft is deflected and rotating, is a function of the amount of deflection in the shaft. It is used in the present invention to move pistons in and out of cylinders. Three or more pistons, located around the approximate centerline of the shaft are actuated by this wobble plate motion, and appropriate valving allows a fluid to move through the cylinders. Resistance to the flow of the fluid provides a damping force and, as a result, controls the deflection in the rotating shaft.

With respect to a shaft experiencing "whirl," it is known that when the shaft is operating at one of its critical speeds, the direction of shaft displacement or deflection takes place 90° behind the shaft unbalance. Accordingly, control of deflection due to shaft unbalance necessitates a damping force reacting against the shaft's orbital velocity and applied vectorially 180° behind the unbalance. The application of such a force will create damping in a direction 180° behind the unbalance. Although shaft deflection has been referred to in some detail above, it should be understood that the orbital velocity is the prime parameter which must be controlled in order to achieve a satisfactory control of shaft deflections through damping. Damping must consider this prime parameter if positive control of shaft deflection at critical speeds is to be achieved. The present invention provides a method and apparatus which utilizes the wobble action of the end of a shaft to apply a vectorial force which decreases the orbital velocity or "whirling" parameter to thereby provide a positive control of shaft deflection. Since the orbital velocity is a function of the deflection in the shaft, the application of a vectorial force 180° behind and opposite to the unbalance force reduces the effect of the unbalance force and produces a resultant reduction in the orbital velocity and, consequently, in the deflection.

Accordingly, the present invention provides a reactive means that senses the deflection of the shaft and applies a vectorial damping force 90° behind the deflection in the shaft. Thus the reactive means of the present invention ensures that the damping force is applied at the desired point.

Furthermore, the damping force is determined by the amplitude of the deflection in the shaft and the speed of the shaft. This permits positive control of shaft deflection during operation within the supercritical speed range.

An object of this invention is to dampen the unbalanced force and control the deflection of a rotating shaft.

Another object of this invention is to provide a damping structure that provides positive control during shaft rotation at supercritical speeds.

A further object of this invention is to provide a relatively simplified damping structure for use with a rotating shaft.

Still another object of this invention is to provide a power transmission system wherein torque can be transferred by a shaft operating within its supercritical speed range without inducing vibration in the driven member.

A still further object of this invention is to provide a method for damping the unbalanced forces of a shaft rotating at a critical speed.

Other objects of this invention will be readily perceived from the following description, claims, and drawings.

This invention relates to the combination of a rotating shaft and reactive means disposed in cooperating engagement with the shaft to dampen deflections in a bending mode when the shaft rotates, the reactive means being responsive to the deflection and applying a damping force to the shaft substantially 90° out of phase with the deflection of the shaft and lagging the deflection.

This invention also relates to a method for damping deflections in a bending mode of a rotating shaft. The method comprises the steps of sensing the shaft deflection and generating a damping force in response thereto and applying the damping force to the shaft substantially 90° behind the deflection.

This invention further relates to the combination of a rotating drive shaft and a driven shaft with means coupling the shafts to each other whereby the drive shaft rotates the driven shaft, which is supported by suitable means. The driven shaft support means is adapted to support reactive means for damping deflections in a bending mode in the drive shaft which is coupled to the driven shaft.

Additionally, this invention relates to the combination of a rotating shaft and an actuating means connected to the shaft and responsive to deflections therein. A damping means disposed in cooperating engagement with the actuating means serves to dampen shaft deflections when the shaft rotates. The damping means is responsive to the movements of the actuating means when the shaft rotates in a deflected condition and applies a damping force to the shaft substantially 90° out of phase with the deflection of the shaft and lagging the deflection.

Figure 2:
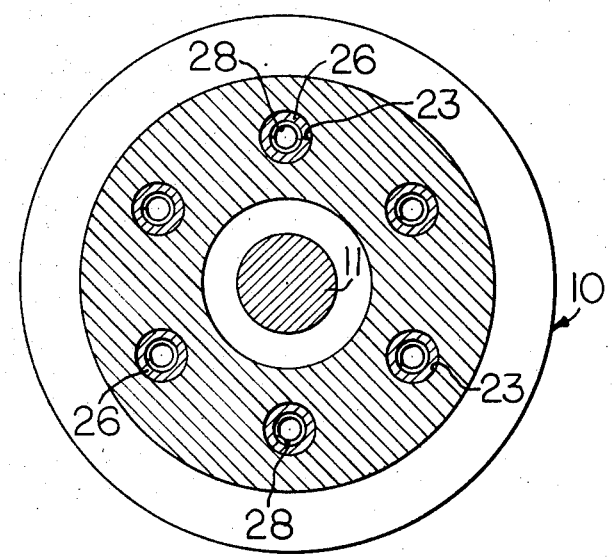

The attached drawing illustrates a preferred embodiment of the invention, in which:

FIGURE 1 is a longitudinal sectional view of the damping structure of the present invention; and FIGURE 2 is a sectional view taken along the line 2—2 of FIGURE 1.

Referring to the drawing, there is shown a housing 10, which may be a transmission housing, for example. A shaft 11 is rotatably supported within the housing 10 by suitable means (not shown).

The shaft 11 is adapted to be driven by a drive shaft 12. A coupling means 14 longitudinally connects one end of the shaft 12 to one end of the shaft 11 whereby the shaft 12 may drive the shaft 11 while permitting deflections in the shaft 12. The coupling means 14 preferably includes angularly spaced ribs 15 on the interior of the drive shaft 12 at one end thereof and angularly spaced ribs 16 on the outer surface of one end of the driven shaft 11. The ribs 15 and 16 are adapted to be disposed between each other to provide driving engagement therebetween.

The other end of the shaft 12 is disposed within a housing 17, which includes a power means such as an engine for rotatably driving the shaft.

The end of the drive shaft 12 associated with housing 10 is supported therein for rotation with respect thereto. The drive shaft 12 has a bearing assembly 18 on its outer surface at its end disposed within the housing 10. The bearing assembly 18 has an inner race 19 which is fixed to the shaft 12 and an outer race 20 which is rotatable with respect to the inner race 19 through balls 21. The outer race 20 rides on a spherical surface 22 of the housing 10.

The damping structure includes a plurality of cylinders 23 equally spaced from each other in a manner to form a pattern which is concentric with the longitudinal axis or centerline 24 of the shaft 11. Each of the cylinders 23 has a piston 26 movable therein. Each of the pistons 26 has a projection 27 extending outwardly therefrom for engagement with the outer race 20 of the bearing assembly 18.

A spring 28 is disposed within each of the cylinders 23 to constantly urge the projection 27 of the piston 26 into engagement with the outer race 20 of the bearing assembly 18 irrespective of the deflection of the shaft 12. This ensures that the piston 26 is responsive to any deflection in the shaft 12.

The housing has an annular fluid reservoir 29 therein. Fluid can be added to the reservoir by removing a plug 30.

The reservoir 29 communicates with each of the cylinders 23 through an inlet passage 31, which extends from the reservoir 29 to the end of the cylinder 23 which is remote from the end through which the piston 26 reciprocates. The reservoir 29 also communicates through an outlet passage 32 with the end of the cylinder 23 having the inlet passage 31 communicating therewith.

Fluid flows from the reservoir 29 into the interior of each of the cylinders 23 through the inlet passage 31. A check valve 33 prevents escape of fluid from the cylinder 23 through the inlet passage 31 when the piston 26 is moved inwardly. The outlet passage 32 has an orifice 34 therein to restrict flow therethrough. The orifice 34 requires a substantial force to be exerted on the fluid by the piston 26 in order for the fluid to be pumped out of the cylinder 23 through the outlet passage 32 into the reservoir 29.

The reservoir 29, the cylinders 23, the inlet passages 31, and the outlet passages 32 form a closed fluid system. A substantially constant volume of fluid is maintained within the closed fluid system. As one of the pistons 26 is moved into its cylinder 23, the fluid which escapes therefrom through the orifices 34 in the outlet passage 32 is transmitted to the other cylinders 23, wherein the pistons 26 are moving outwardly.

Considering the operation of the present invention with the shaft 12 operating with no deflection, all of the pistons 26 are extended the same distance by their springs 28 since the shaft 12 has no deflection and the bearing is in plane. In rotation of the shaft 12 with no deflection, the outer race 20 has its end surface, which engages the projections 27 of the pistons 26, disposed in a substantially vertical plane. Thus, all of the pistons 26 extend the same distance from the cylinders 23.

When an unbalanced shaft 12 operates at one of its critical speeds, it rotates in a deflected manner as shown, for example, in FIGURE 1. With this occurring, the outer race 20 of the ball bearing assembly 18 will cause maximum depression of the pistons 26 at twelve (12) o'clock in FIGURE 2 and maximum extension of the piston 26 at six (6) o'clock in FIGURE 2.

At any of the cylinders 23, the rotation of the deflected shaft 12 results in successive maximum inward movement of the pistons 26 and then a successive outward movement thereof. Accordingly, the surface of the bearing 18 which is in abutting engagement to the pistons 26 acts as a wobble plate which oscillates the pistons 26 as the shaft drives the bearing 18 in its out-of-plane condition. This displacement of the pistons 26 is sinusoidal in respect to time. In like manner, it is clear that piston speed will vary and maximum velocity of depression or extension of the pistons 26 will occur at the midpoints of extension or depression traversal. Accordingly, the velocity of the pistons 26 may also be shown as a sinusoidal curve.

If the shaft 12 is assumed to be rotating clockwise in FIGURE 2 with maximum inward depression at the upper of the pistons 26 (twelve (12) o'clock), the pistons 26 at two (2) o'clock and four (4) o'clock are moving inwardly while the pistons 26 at eight (8) o'clock and ten (10) o'clock are moving outwardly. Of course, the piston at six (6) o'clock has, at this point, reached maximum extension. During rotation, each of the diametrically disposed pistons 26 has the same amount of movement in opposite directions. Thus, the volume of fluid being displaced from one of the opposed cylinders 23 by inward movement of the piston 26 is the same volume of fluid being made available in the other diametrically disposed cylinder 23 by outward movement of the piston 26.

Thus, since the closed fluid system has a substantially constant volume of fluid, approximately the same volume of fluid pumped out of the cylinders 23 into the reservoir 29 by inward movement of the pistons 26 flows into the cylinders 23 in which the pistons 26 are moving outwardly. Accordingly, all of the cylinders 23 remain filled with fluid in accordance with the position of the piston 26 therein.

The inward movement of the piston 26 requires a substantially greater force to pump the fluid out of the cylinder 23 through the orifice 34 in the outlet passage 32 than is required for the fluid to enter the cylinder 23 through the inlet passage 31 past the check valves 33. This force of pumping the fluid out of the cylinder 23 is employed to provide a damping force which is translated vectorially to the shaft in a direction opposite to the unbalance force and 90° behind the deflection. This force, therefore, controls the shaft deflection and, more particularly, is applied to minimize the parameter of orbital velocity.

The volume of fluid pumped from the cylinder 23 is proportional to the distance that the piston 26 is moved inwardly. The distance of inward movement and velocity of the piston 26 are determined by the amplitude of deflection and the speed of rotation of the shaft 12. Thus, for example, if either the amplitude of deflection or speed of rotation of the shaft 12 increases, there is an increase in the volume of fluid pumped per unit of time from the cylinder 23 by the piston 26.

The inward movement of the piston 26 to pump the fluid from the cylinder 23 creates a reactive force through the piston extension 27 against the outer race 20 of the bearing assembly 18. This reactive force varies in accordance with the amplitude of the deflection and the speed of rotation of the shaft 12.

The damping force is determined by the volume of fluid pumped by the piston 26 from the cylinder 23 in a given period of time. Thus, for example, a greater velocity of the piston 26 produces a greater damping force.

As set forth above, for a given deflection amplitude and rotating shaft speed, the maximum velocity of a piston 26 occurs 90° before the maximum piston depression. This reactive force of the piston 26 on the end of the shaft 12 creates a moment on the shaft 12. This moment on the shaft 12 caused by the damping will tend to reduce the orbital or whirling velocity. That is, the deflected shaft 12 has an orbital velocity in a plane substantially perpendicular to the axes of the cylinders 23, and the moment produced on the shaft 12 by the axial reactive force of the piston 26 is applied in direct opposition to the orbital velocity of the shaft undergoing whirl. Accordingly, this force is applied 180° out of phase with respect to the unbalance and causes a decrease in the orbital velocity. Since the orbital velocity is a function of the deflection of the shaft 12, reduction of the orbital velocity decreases the deflection. Accordingly, the reactive force may be vectorially considered to be 90° behind shaft deflection and 180° out of phase with shaft unbalance.

While six of the cylinders 23 have been shown, it is preferable that a minimum of three of the cylinders 23 and their cooperating pistons 26 be used to create a satisfactory damping structure that will provide omnidirectional control of the shaft 12. Of course, more than six of the cylinders 23 and their correlated structure may be employed if desired. Naturally, the greater the number of the cylinders 23, the greater the refinement of the damping of the deflection of the shaft 12. It should be understood that any damping structure that senses the axial oscillations of the shaft and provides a damping force responsive thereto can be utilized.

If an odd number of the cylinders 23 are employed, they will not be oppositely disposed due to their equal angular spacing. However, the total volume within the cylinders 23 will remain constant so that fluid being pumped out of one of the cylinders 23 will be available to be received in another of the cylinders 23.

An advantage of this invention is that it permits a shaft to operate safely at a supercritical speed. Another advantage of this invention is that it reduces the weight of the shaft system since it provides for the elimination of the requirements of a subcritical system wherein additional adapters, fittings, bearings, and hangers are required. A further advantage of this invention is that it reduces the maintenance of a power shaft since only a single shaft need be employed. Still another advantage of this invention is that the cost of a power transmission shaft is reduced due to the potential elimination of the additional adapters, fittings, bearings, and hangers that are used with subcritical systems. Because of the elimination of the various additional elements of a subcritical system, the present invention has the still further advantage of providing a shaft with increased reliability.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. In combination, a rotating shaft, a reactive means disposed in co-operating engagement with said shaft to dampen shaft deflections when said shaft rotates, said reactive means being responsive to the angular deflections of said shaft and applying a damping force to said shaft substantially 90° out of phase with the deflection of said shaft and lagging the deflection.

2. In combination, a rotating shaft, an actuating means connected to said shaft and responsive to deflections therein, and a damping means disposed in co-operating engagement with said actuating means to dampen shaft deflections when said shaft rotates, said damping means being responsive to the angular movements of said actuating means when said shaft rotates in a deflected condition and applying a damping force to said shaft substantially 90° out of phase with the reflection of said shaft and lagging the deflection.

3. The combination according to claim 2 wherein said actuating means is responsive to the amplitude of deflection and speed of rotation of said shaft and actuates said dampening means in response thereto, whereby said damping means applies a damping force to said shaft dependent upon the amplitude of deflection and speed of rotation of said shaft.

4. The combination according to claim 3 wherein said actuating means is adapted to permit controlled, rotational and lateral movement of said shaft when said shaft is rotating in a deflected condition.

5. The combination according to claim 4 wherein said actuating means is a bearing having a convex periphery.

6. In combination, a rotating shaft, damping means disposed adjacent one end of said shaft to dampen shaft deflection, actuating means mounted on said shaft adjacent one end thereof in abutting, co-operating engagement with said damping means, said damping means being responsive to the axial oscillations of said actuating means when said shaft is rotating in a deflected state, whereby said damping means applies a damping force to said shaft.

7. In combination, a rotating drive shaft, a driven shaft, means coupling said shafts to each other, whereby said drive shaft rotates said driven shaft, a bearing means mounted on said drive shaft adjacent its end, a portion of said bearing means oscillating axially in response to the rotation of said drive shaft in a deflected state, and a damping means disposed coaxially to said driven shaft in co-operating engagement with said bearing means and responsive to the axial oscillations of said portion of said bearing means.

8. In combination, a rotating drive shaft, a driven shaft, means coupling said shafts to each other, whereby said drive shaft rotates said driven shaft, means to support said driven shaft, means to support said drive shaft, a damping means supported by said driven shaft support means and adapted to apply a damping force to said drive shaft in response to the movement of said drive shaft support means when said drive shaft is rotating in a deflected state, said damping means applying said damping force to said drive shaft in a manner to reduce said drive shaft's orbital velocity.

9. In combination, a rotating drive shaft, a driven shaft, means coupling said shafts to each other, whereby said drive shaft rotates said driven shaft, a support housing for said driven shaft, a damping means supported by said support housing, said damping means comprising at least three cylinders angularly spaced from each other concentrically about the axis of said driven shaft, a piston means disposed in said cylinders and movable therein, means for urging said piston means outward toward said drive shaft, a fluid reservoir, said cylinders having an inlet and an outlet, means to connect said inlet and said outlet of said cylinders with said reservoir to provide fluid flow therebetween and means to close said inlet of said cylinders when said piston means is forced inwardly against said urging means, said piston means pumping fluid from said cylinders through said outlet when faced inwardly, means to support said drive shaft, said means adapted to permit controlled, rotational and lateral movement of said drive shaft when said drive shaft is rotating in a deflected condition, said drive shaft support means being responsive to the amplitude of deflection and speed of rotation of said drive shaft and oscilating in an axial direction when said drive shaft rotates in a deflected state, said damping means disposed in abutting co-operating engagement with said drive shaft support means, said drive shaft support means causing said piston means to move inwardly in response to the axial oscillations thereof, said drive shaft support means actuating said damping means in response to the amplitude of deflection and the speed of rotation of said drive means when said drive means is rotating in a deflected state, said damping means applying a damping force to said drive shaft substantially 90° out of phase with the deflection of said shaft and lagging the deflection, said damping force serving to reduce said drive shaft's orbital velocity in proportion to the amplitude of deflection and speed of rotation of said drive shaft.

10. In combination, a rotating shaft, an actuating means connected to said shaft and responsive to deflections therein, and a damping means disposed in cooperating engagement with said actuating means to dampen shaft deflections when said shaft rotates, said damping means being responsive to the movements of said actuating means when said shaft rotates in a deflected condition and applying a damping force to said shaft substantially ninety degrees out of phase with the deflection of said shaft and lagging the deflection, and wherein said actuating means is responsive to the amplitude of deflection and speed of rotation of said shaft and actuates said damping means in response thereto, whereby said damping means applies a damping force to said shaft dependent upon the amplitude of deflection and speed of rotation of said shaft, and wherein said damping means comprises at least three cylinders angularly spaced from each other, a piston means disposed in said cylinders and movable therein, means for maintaining said piston means in cooperating engagement with said actuating means, whereby said piston means responds to the deflection in said rotating shaft, a fluid reservoir, said cylinders having an inlet and an outlet, means to connect said inlet and said outlet of said cylinders with said reservoir to provide fluid flow therebetween, and means to close said inlet of said cylinders when said piston means responds to said actuating means, whereby said piston means pumps fluid from said cylinders through said outlet to provide a damping force.

References Cited

UNITED STATES PATENTS

| | | | |
|---|---|---|---|
| 989,958 | 4/1911 | Frahm | 64—1 |
| 1,581,554 | 4/1926 | Soltau | 74—574 |
| 1,768,290 | 6/1930 | Newkirk | 64—1 |
| 1,961,679 | 6/1934 | Walti | 64—1 |
| 2,522,958 | 9/1950 | Palmer | 64—1 |
| 2,652,700 | 9/1953 | Seibel | 64—1 |

FOREIGN PATENTS 726,791   3/1955   Great Britain.

HALL C. COE, *Primary Examiner.*

U.S. Cl. X.R.

64—1; 74—574; 308—194